US009564826B2

United States Patent
Sugahara et al.

(10) Patent No.: US 9,564,826 B2
(45) Date of Patent: Feb. 7, 2017

(54) CURRENT RESONANT POWER SUPPLY DEVICE

(71) Applicant: SANKEN ELECTRIC CO., LTD., Niiza-Shi, Saitama (JP)

(72) Inventors: Takeki Sugahara, Higashimatsuyama (JP); Osamu Ohtake, Saitama (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days.

(21) Appl. No.: 14/749,690

(22) Filed: Jun. 25, 2015

(65) Prior Publication Data
US 2016/0065075 A1 Mar. 3, 2016

(30) Foreign Application Priority Data
Aug. 29, 2014 (JP) .................. 2014-174959

(51) Int. Cl.
H02M 1/42 (2007.01)
H02M 3/337 (2006.01)
H02M 1/00 (2006.01)

(52) U.S. Cl.
CPC ......... H02M 3/3376 (2013.01); H02M 1/4225 (2013.01); *H02M 2001/007* (2013.01); *H02M 2001/0009* (2013.01); *H02M 2001/0035* (2013.01); *H02M 2001/0058* (2013.01); *Y02B 70/1433* (2013.01); *Y02B 70/16* (2013.01)

(58) Field of Classification Search
None
See application file for complete search history.

(56) References Cited

U.S. PATENT DOCUMENTS

| 2003/0231012 A1* | 12/2003 | Corva | H02M 3/156 323/285 |
| 2005/0269997 A1* | 12/2005 | Usui | H02M 1/4225 323/207 |
| 2010/0020578 A1* | 1/2010 | Ryu | H02M 1/4225 363/68 |
| 2012/0113689 A1* | 5/2012 | Chen | H02M 3/33523 363/21.17 |

(Continued)

FOREIGN PATENT DOCUMENTS

| JP | 5384973 B2 | 10/2013 |
| JP | 2014-060895 A | 4/2014 |

*Primary Examiner* — Jeffrey Gblende
(74) *Attorney, Agent, or Firm* — Mots Law, PLLC (57) ABSTRACT

First and second switch are connected in series to both terminals of a DC power source. A series circuit comprising a reactor, a primary winding of a transformer, and a capacitor connected in series, and is connected to a node between the first and second switches and one terminal of the DC power source. A rectifier smoothing circuit rectifies and smoothens a voltage generated across a secondary winding of the transformer and outputs a DC voltage. A control circuit alternately turns the first and second switches on and off. A voltage detection circuit detects the DC voltage from the rectifier smoothing circuit. A signal generation circuit generates a feedback signal from the DC voltage detected by the voltage detection circuit, and outputs the signal for turning the first and second switches on and off. A load current detection circuit detects load current contained in resonance current flowing through the capacitor.

8 Claims, 4 Drawing Sheets

(56) References Cited

U.S. PATENT DOCUMENTS

| | | | | |
|---|---|---|---|---|
| 2012/0188797 A1* | 7/2012 | Nakanishi | ......... | H02M 3/33507 363/21.02 |
| 2012/0320636 A1* | 12/2012 | Tsuchiyama | ........ | H02M 3/3376 363/21.02 |
| 2014/0070781 A1* | 3/2014 | Yanagida | .................. | G05F 1/10 323/271 |

* cited by examiner

CURRENT RESONANT POWER SUPPLY DEVICE

CROSS REFERENCE TO RELATED APPLICATIONS

This application claims priority based on 35 USC 119 from prior Japanese Patent Application No. 2014-174959 filed on Aug. 29, 2014, entitled "CURRENT RESONANT POWER SUPPLY DEVICE", the entire contents of which are hereby incorporated by reference.

BACKGROUND

The disclosure relates to a current resonant power supply device, and particularly relates to a current resonant power supply device, which can achieve reduced power consumption under light load.

Japanese Patent Application Publication No. 2014-60895 (Patent Literature 1) and Japanese Patent No. 5384973 (Patent Literature 2) disclose current resonant power supply devices that can achieve reduced power consumption under light load.

The current resonant power supply device of Patent Literature 1 judges whether the device is currently in a light load state by comparing a power value detected by the power detection circuit with threshold Vref, and performs a burst oscillation operation while controlling the cycle of the burst oscillation if judging that the device is currently in the light load state.

The current resonant power supply device of Patent literature 2 detects the phase of current flowing through the switching elements. If the phase of the current thus detected is smaller than a predefined value, the current resonant power supply device judges that the device is currently in a light load state, and thus operates in a burst oscillation mode while operating the high side switch and the low side switch at unequal duty ratios.

Meanwhile, when changed to a standby load state, an Inductor Inductor Capacitor (LLC) current resonant system receives a standby signal received from outside, and switches from a normal mode to a standby mode.

Specifically, the standby signal is outputted from a system microcomputer on the secondary side of a transformer and is inputted into a power control integrated circuit (IC) on the primary side of the transformer via a photocoupler. For example, an SB terminal of the power control IC on the primary side of the transformer receives the standby signal from the photocoupler on the secondary side of the transformer.

The current resonant power supply devices of Patent Literatures 1 and 2 are capable of transitioning to a burst mode upon detection of a light load state.

SUMMARY

An embodiment provides a current resonant power supply device that comprises a first switch and a second switch connected in series to both terminals of a DC power source, a series circuit comprising a reactor, a primary winding of a transformer, and a capacitor connected in series, and connected to anode between the first and second switches and one terminal of the DC power source, a rectifier smoothing circuit that rectifies and smoothens a voltage generated across a secondary winding of the transformer and outputs a DC voltage, a control circuit that alternately turns the first and second switches on and off, a voltage detection circuit that detects the DC voltage from the rectifier smoothing circuit, a signal generation circuit that generates a feedback signal based on the DC voltage detected by the voltage detection circuit, and outputs the feedback signal, the feedback signal being for turning the first and second switches on and off, a load current detection circuit that detects load current contained in resonance current flowing through the capacitor, a standby state detection circuit that detects a standby state based on the load current detected by the load current detection circuit and a standby threshold, and a burst oscillation circuit that operates the first and second switches in a burst oscillation mode based on the feedback signal if the standby state is detected.

DETAILED DESCRIPTION

Embodiments of current resonant power supply devices are explained with referring to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

[First Embodiment]

Figure 1:
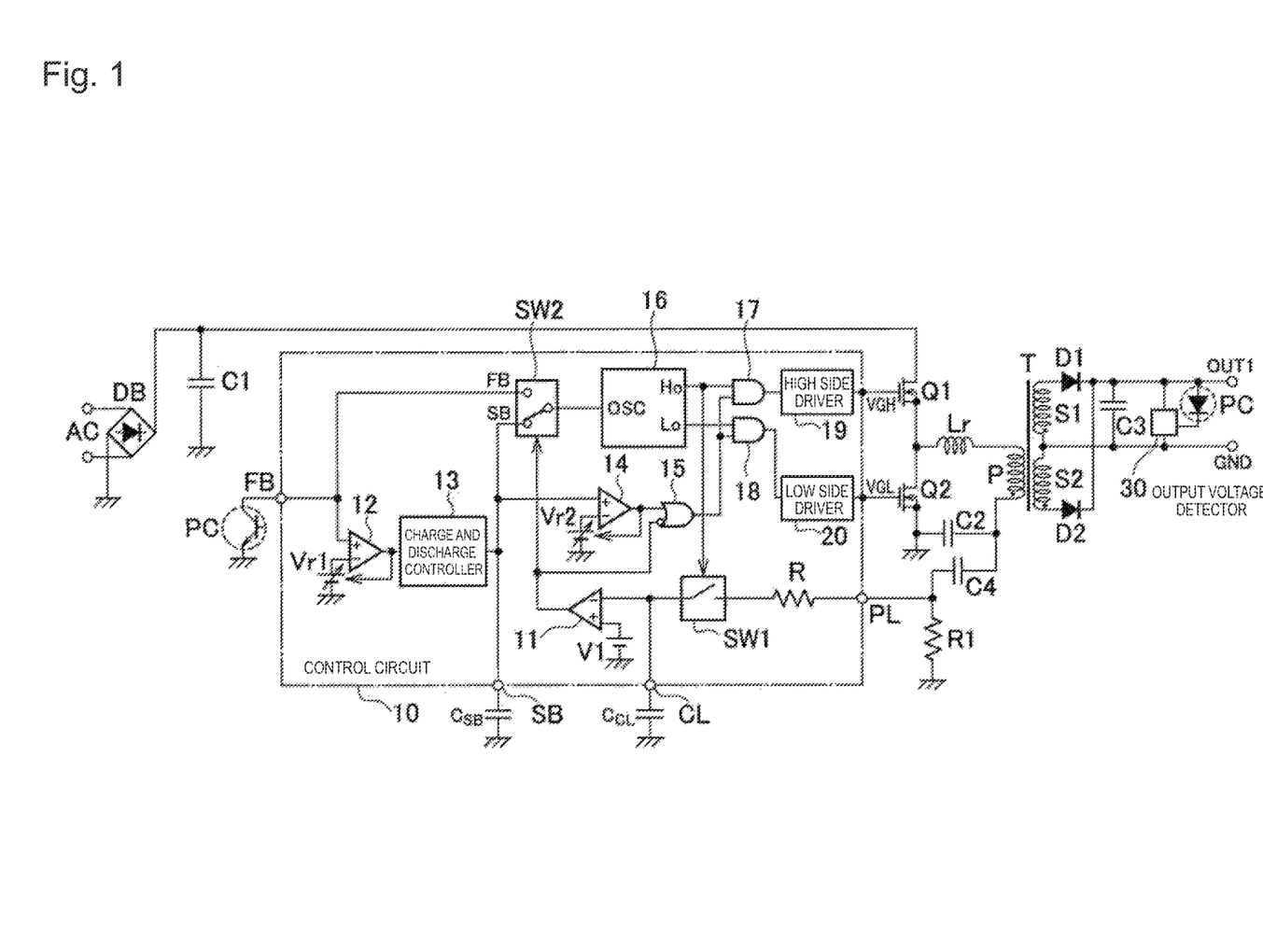
FIG. 1 is a configuration diagram of a current resonant power supply device according to a first embodiment.

FIG. 1 is a diagram illustrating a configuration of a current resonant power supply device according to a first embodiment. The current resonant power supply device illustrated in FIG. 1 includes full-wave rectifier circuit DB, capacitor C1, control circuit 10, reactor Lr, switching elements Q1 and Q2, transformer T, diodes D1 and D2, capacitors C2 to C4, photocoupler PC, output voltage detector 30, capacitors CCL and CsB, and resistor R1.

Full-wave rectifier circuit DB is configured to perform full-wave rectification of an AC voltage and output, via capacitor C1, a full-wave rectified voltage to switching elements Q1 (first switching element) and switching element Q2 (second switching element) that are connected in series. Switching elements Q1 and Q2 each include a switching element such as a MOSFET.

A series circuit including reactor Lr for current resonance, primary winding P of transformer T, and capacitor C2 for current resonance is connected between the drain and source of switching element Q2. Secondary winding S1 and secondary winding S2 of transformer T are connected in series, and the anode of diode D1 is connected to one terminal of secondary winding S1. The anode of diode D2 is connected to one terminal of secondary winding S2.

The cathode of diode D1 and the cathode of diode D2 are connected to one terminal of capacitor C3, the anode of a photodiode of photocoupler PC, and one terminal of output voltage detector 30. The other terminal of secondary winding S1 and the other terminal of secondary winding S2 are connected to the other terminal of capacitor C3 and the other terminal of output voltage detector 30.

Switching element Q1 and switching element Q2 are alternately turned on and off according to a control signal from control circuit 10. Output voltage detector 30 is configured to detect an output voltage across capacitor C3, and output the voltage thus detected to a FB terminal of primary-side control circuit 10 as a feedback signal via photocoupler PC.

Control circuit 10 is configured to alternately turn switching element Q1 and switching element Q2 on and off based on a feedback signal from output voltage detector 30. One terminal of capacitor C4 is connected to one terminal of primary winding P of transformer T and one terminal of capacitor C2, one terminal of resistor R1 is connected to the other terminal of capacitor C4, and the other terminal of resistor R1 is grounded.

Control circuit 10 is constituted by an integrated circuit (IC), and includes comparators 11, 12, and 14, charge and discharge controller 13, logic circuit 15, oscillator (OSC) 16, AND circuits 17 and 18, high side driver 19, and low side driver 20.

Control circuit 10 includes: a VGH terminal connected to the gate of switching element Q1, a VGL terminal connected to the gate of switching element Q2, a PL terminal connected to the one terminal of resistor R1, a CL terminal connected to capacitor CCL, an SB terminal connected to capacitor CSB, and the FB terminal connected to the collector of a phototransistor in photocoupler PC.

(Configuration of Current Resonant Power Supply Device According to First Embodiment)

Next, the current resonant power supply device according to the first embodiment is described. The current resonant power supply device has a function to switch its mode from a normal mode to a standby mode by detecting a load of a standby state inside the IC without receiving any standby signal from the outside (automatic standby function). The load in the standby state is detected using information on current flowing through the primary wiring of the transformer.

In an LLC current resonance system, the current flowing through the primary winding of the transformer contains cyclic current (current not to be sent to a secondary side of the transformer) and load current (current in proportion to output current). The current resonant power supply device can detect the standby state by retrieving only information on the load current from the current of the primary winding.

Figure 2A:
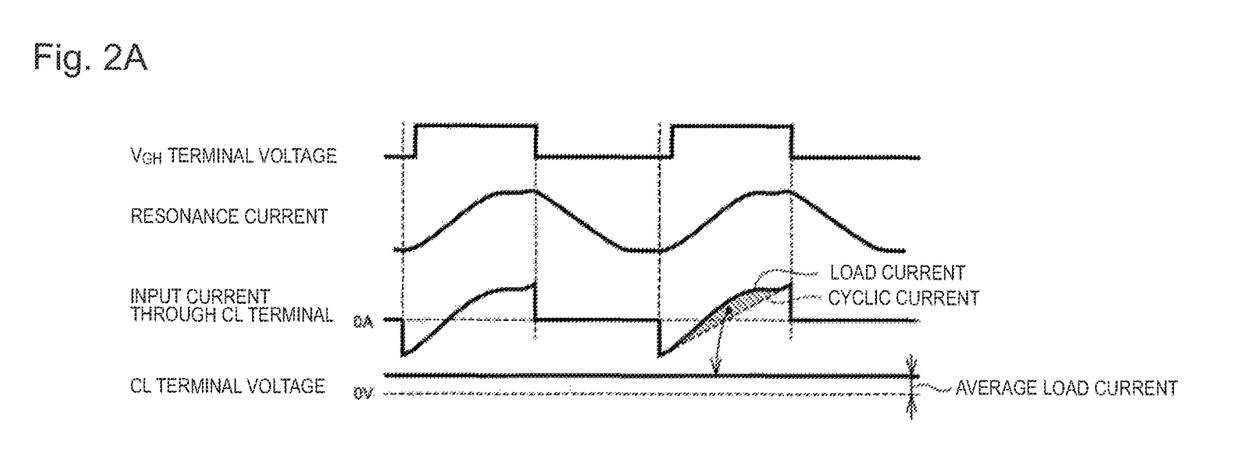
FIGS. 2A and 2B are timing charts illustrating operations of parts of the current resonant power supply device according to the first embodiment under light load and heavy load.
Figure 2B:
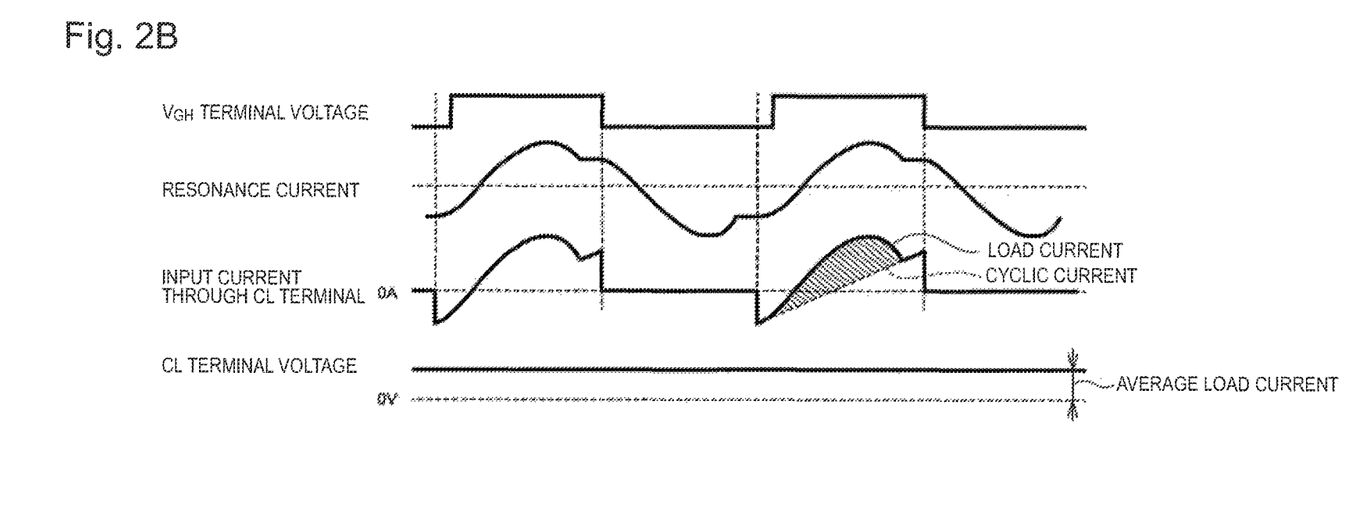

FIGS. 2A and 2B are timing charts illustrating operations of parts of the current resonant power supply device according to the first embodiment under light load and heavy load. FIG. 2A illustrates waveforms under light load and FIG. 2B illustrates waveforms under heavy load. In general, the oscillating cycle under heavy load is longer than that under light load.

As illustrated in FIGS. 2A and 2B, resonance current flows through primary winding P of transformer T upon application of a VGH terminal voltage of a pulse signal onto the gate of switching element Q1. The resonance current is extracted by capacitor C4 (equivalent to a load current detection circuit of the embodiments) and inputted to the CL terminal via switch SW1 of control circuit 10, so that input current through the CL terminal is obtained. The input current through the CL terminal contains load current and cyclic current similarly to the current of the primary winding of the transformer described above.

As illustrated in FIGS. 2A and 2B, in the case of taking in the input current through the CL terminal during an on period of switching element Q1, the cyclic current flows in the same amount on the positive and negative sides as represented by the waveforms and therefore becomes zero on average. On the other hand, the load current is integrated over the on period by capacitor CCL connected to the CL terminal, and thus a CL terminal voltage being a DC voltage equivalent to an average load current value is obtained. Since the CL terminal voltage reflects information on the load current, the CL terminal voltage (or average load current) under heavy load is higher than that under light load. Note that capacitors C4 and CCL correspond to the load current detection circuit of the embodiments.

Standby detection comparator 11 corresponds to a standby state detection circuit of the embodiments. Standby detection comparator 11 is configured to receive input of a voltage across capacitor CCL at its inverting input terminal and input of standby threshold V1 at its non-inverting input terminal. If the voltage across capacitor CCL is equal to or higher than standby threshold V1, standby detection comparator 11 detects a normal state, and thus outputs L level to logic circuit 15 and switch SW2 and selects the FB terminal of switch SW2.

In this case, the feedback signal inputted to the FB terminal is outputted to oscillator (OSC) 16 via switch SW2, and oscillator (OSC) 16 controls the oscillating cycle (frequency) of a pulse signal according to the value of the feedback signal and generates a high-side pulse signal and a low-side pulse signal. In the high-side (Ho) pulse signal and the low-side (Lo) pulse signal, their signal levels change between H level and L level alternately with dead time in between.

AND circuit 17 is configured to AND the high-side (Ho) pulse signal and an output from logic circuit 15 and send a logic output to high side driver 19. AND circuit 18 is configured to AND the low-side (Lo) pulse signal and the output from logic circuit 15 and send a logic output to low side driver 20.

High side driver 19 is configured to turn switching element Q1 on or off in response to the output from AND circuit 17. Low side driver 20 is configured to turn switching element Q2 on or off in response to the output from AND circuit 18.

In the case where standby detection comparator 11 detects the normal state, logic circuit 15 outputs H level to AND circuits 17 and 18, and hence switching element Q1 and switching element Q2 are alternately turned on and off.

Next, if the voltage across capacitor CCL is lower than standby threshold V1, standby detection comparator 11 detects a standby state, and thus outputs H level to logic circuit 15 and switch SW2 and selects a standby terminal (SB terminal) of switch SW2.

Comparator 12 is configured to receive input of a feedback signal from the FB terminal at its non-inverting input terminal and input of first reference voltage Vr1 at its inverting input terminal, and turn on charge and discharge controller 13 if the feedback signal is equal to or higher than first reference voltage Vr1.

Capacitor CSB is connected to the SB terminal of switch SW2 and an output terminal of charge and discharge controller 13. Charge and discharge controller 13 is configured to charge capacitor CSB while it is in an on state.

The non-inverting input terminal of comparator 14 is connected to one terminal of capacitor CsB, the SB terminal of switch SW2, and an output terminal of charge and discharge controller 13. Comparator 14 corresponds to a burst oscillation operation unit, and is configured to receive input of a voltage of capacitor CSB at its non-inverting input terminal and input second reference voltage Vr2 at its inverting input terminal. If the voltage of capacitor CsBis equal to or higher than second reference voltage Vr2, comparator 14 outputs H level to logic circuit 15.

In this case, logic circuit 15 outputs H level to AND circuits 17 and 18, and the pulse signals of oscillator (OSC) 16 are thereby outputted to high side driver 19 and low side driver 20. Thus, switching element Q1 and switching element Q2 are alternately turned on and off.

Then, if the feedback signal becomes lower than first reference voltage Vr1, charge and discharge controller 13 is set at an off state and therefore capacitor CSB is discharged. Then, if the voltage of capacitor CSB becomes lower than second reference voltage Vr2, comparator 14 outputs L level to logic circuit 15 to stop output from oscillator (OSC) 16. The burst oscillation operation of the switching operation can be achieved by the repetition of the above processes.

In other words, comparator 12 charges or discharges capacitor CSB via charge and discharge controller 13 based on a comparison between the feedback signal and first reference voltage Vr1, which can determine an output voltage variation range during the standby state.

Figure 3:
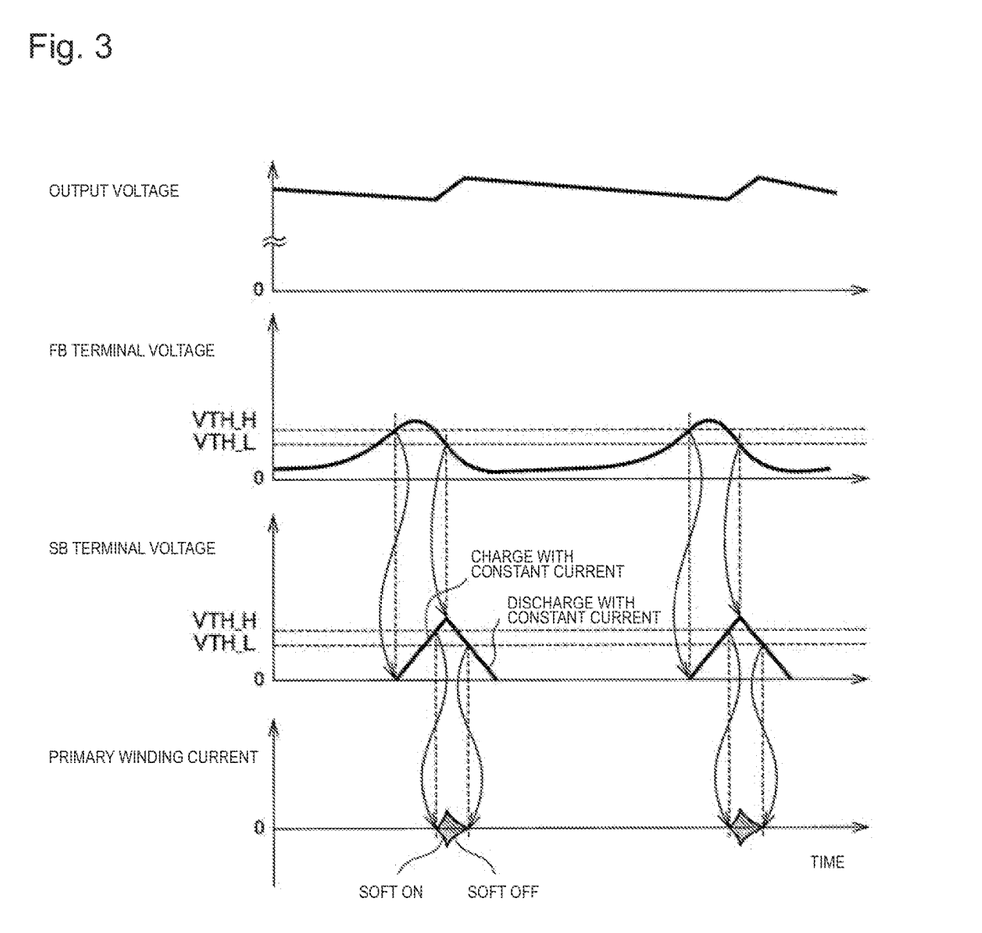
FIG. 3 is a timing chart illustrating waveforms at the time of a burst oscillation operation of the current resonant power supply device according to the first embodiment.

Next, the burst oscillation operation is described in detail with reference to a timing chart illustrated in FIG. 3. First, if the SB terminal voltage becomes equal to or lower than oscillation stop voltage VTH_L and if the FB terminal voltage becomes oscillation stop voltage VTH_L, the switching operation stops and the output voltage decreases. As the output voltage decreases, the FB terminal voltage increases. If the FB terminal voltage reaches oscillation start voltage VTH_H, the voltage of the non-inverting input terminal of comparator 12 becomes high, and hence comparator 12 outputs an H level signal to charge and discharge controller 13 to charge capacitor CSB at the SB terminal with a constant current value. The SB terminal voltage thereby increases with a constant slope. Comparator 12 also decreases the voltage value of reference voltage Vr1 by a certain amount once the output becomes H level.

Next, if the SB terminal voltage reaches oscillation start voltage VTH_H, the switching operation restarts. Here, oscillator OSC determines a switching frequency based on the SB terminal voltage. In the state where the SB terminal voltage is low, oscillator OSC outputs a high oscillating frequency and decreases the oscillating frequency along with an increase in the SB terminal voltage. The oscillating frequency in the state of the low SB terminal voltage is higher than the peak of the resonance point of the series circuit including reactor Lr for current resonance, primary winding P of transformer T, and capacitor C2. Accordingly, current flowing through the series circuit is small at first, and then increases gradually as the oscillating frequency gets closer to the frequency of the resonance point along with the increase in the SB terminal voltage, so that the output voltage increases (soft on).

As the output voltage increases, the FB terminal voltage is decreased gradually by the operation of output voltage detector 30 via photocoupler PC. If the FB terminal voltage falls below the value of reference voltage Vr1 (the value decreased by the certain amount), the output from comparator 12 is inverted into L level, and thus charge and discharge controller 13 discharges capacitor CSB at the SB terminal with a constant current value. The SB terminal voltage thereby decreases gradually, and the switching operation stops once the voltage becomes equal to or lower than oscillation stop voltage VTH_L again. Here, as the SB terminal voltage decreases, the oscillating frequency gets farther from the peak of the resonance point of the series circuit including reactor Lr for current resonance, primary winding P of transformer T, and capacitor C2, so that the current flowing through the series circuit is decreased gradually and shut off (soft off).

The charge/discharge period of the SB terminal with soft-on/soft-off function depends on capacitor CsB.

As described above, according to the current resonant power supply device of the embodiment, capacitors C4 and CCL detect load current contained in resonance current flowing through capacitor C2 and then standby detection comparator 11 detects the standby state based on the detected load current and the threshold, and thus a signal for the burst oscillation operation can be generated based on the feedback signal upon detection of the standby state. This enables switching to the standby mode without a standby signal from the outside, which reduces the cost for a photocoupler and its peripheral circuit used for standby.

[Second Embodiment]

Figure 4:
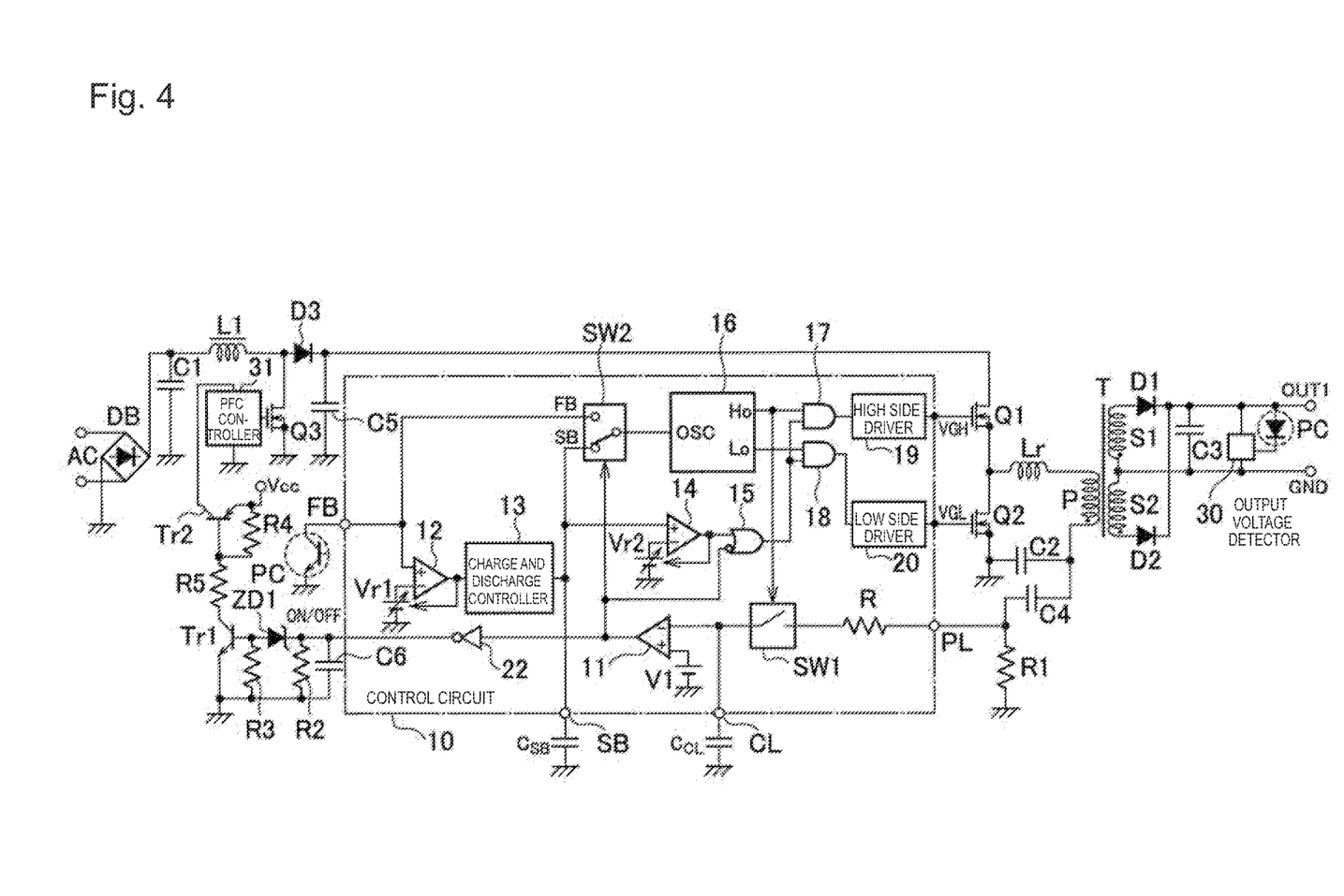
FIG. 4 is a diagram illustrating a configuration of a current resonant power supply device according to a second embodiment.

FIG. 4 is a diagram illustrating a configuration of a current resonant power supply device according to a second embodiment. The current resonant power supply device according to the second embodiment includes power factor correction circuit (PFC controller 31), and reduces power consumption by operating PFC controller 31 in a normal state and stopping PFC controller 31 in a standby state.

The current resonant power supply device according to the second embodiment illustrated in FIG. 4 includes, in addition to the configuration of the current resonant power supply device illustrated in FIG. 1, inverter 22, reactor L1, PFC controller 31, switching element Q3, diode D3, capacitors C5 and C6, resistors R2 to R5, transistors Tr1 and Tr2, and Zener diode ZD1.

One terminal of reactor L1 is connected to one terminal of capacitor C1, and the other terminal of reactor L1 is connected to the drain of switching element Q3 constituted by a MOSFET and the anode of diode D3. The cathode of diode D3 is connected to one terminal of capacitor C5 and the drain of switching element Q1. PFC controller 31 is configured to correct the power factor by turning switching element Q3 on and off.

Inverter 22 has an input terminal connected to an output of standby detection comparator 11, and an output terminal connected to one terminal of capacitor C6, one terminal of resistor R2, and the cathode of Zener diode ZD1. The anode of Zener diode ZD1 is connected to the base of transistor Tr1 and one terminal of resistor R3.

The emitter of transistor Tr1, the other terminal of resistor R3, the other terminal of capacitor C6, and the other terminal of resistor R2 are grounded. The collector of transistor Tr1 is connected to the base of transistor Tr2 and one terminal of resistor R4 via resistor R5.

Power Vcc is fed to the emitter of transistor Tr2 and the other terminal of resistor R4. The collector of transistor Tr2 is connected to PFC controller 31.

A description is next given of how to activate PFC controller 31 of the current resonant power supply device according to the second embodiment having the above configuration. First, if standby detection comparator 11 detects the normal state, that is, if standby detection comparator 11 outputs L level to inverter 22, inverter 22 outputs H level to capacitor C6. Thereby, transistor Tr1 and transistor Tr2 are turned on and power Vcc is fed to PFC controller 31, which activates PFC controller 31.

On the other hand, if standby detection comparator 11 detects the standby state, that is, if standby detection comparator 11 outputs H level to inverter 22, inverter 22 outputs L level to capacitor C6. Thereby, transistor Tr1 and transistor Tr2 are turned off and power Vcc is no longer fed to PFC controller 31, which stops the operation of PFC controller 31.

In common current resonant power supplies, a standby signal and an on/off signal of PFC controller 31 are provided separately. Specifically, the above two control signals outputted from a secondary-side system microcomputer are respectively inputted to a standby circuit and PFC controller 31 of a power control IC via separate photocouplers and these standby circuit and PFC controller 31 are controlled separately. On the other hand, according to the embodiment, a standby signal is generated inside control circuit 10 and outputted through an on/off terminal, and accordingly PFC controller 31 can be turned on and off directly in synchronization with the switching between the standby state and the normal state. Thus, by using the automatic standby function of the first embodiment together, the second embodiment makes it possible not only to reduce power consumption during standby but also to reduce the number of parts because the above two photocouplers and their peripheral circuits are no longer required and eliminate the need for insulation associated with signal exchange between primary and secondary sides because such signal exchange is no longer needed, which leads to a size reduction and improves system reliability.

Note that the invention is not limited to the current resonant power supplies according to the first and second embodiments. For example, by using a combination of information on load current and information on AC input voltage, it is also possible to change a standby threshold voltage according to the AC input voltage.

Further, the standby threshold may be set at a fixed value in control circuit 10 or may be set through external input. In the case of setting the standby threshold through external input, an input terminal may be provided as a dedicated terminal or may be provided as a multipurpose terminal. Further, the standby threshold may be a continuous value or may be a discrete value. Alternatively, hysteresis may be applied to the standby threshold. The on/off terminal through which an on/off signal is outputted from control circuit 10 may be provided as a dedicated terminal or may be provided as a multipurpose terminal.

The current resonant power supply devices of Patent Literatures 1 and 2 detect only a peak value of current or resonance current flowing through the switching elements. Accordingly, these devices are incapable of detecting load power precisely and stably in response to a variation in the waveform of resonance current associated with frequency fluctuation due to input voltage fluctuation and the like.

For this reason, in addition to a photocoupler used for common feedback control, the current resonant power supply devices of Patent Literatures 1 and 2 inevitably need to be provided with a photocoupler to receive a standby signal and peripheral parts constituting its circuit, which results in an increase in cost.

According to the above embodiments, the load current detection circuit detects load current contained in resonance current flowing through the capacitor and the standby state detection circuit detects the standby state based on the detected load current and the threshold, and thus a signal for the burst oscillation operation can be generated based on the feedback signal upon detection of the standby state. This makes it possible to provide a current resonant power supply device capable of switching to the standby mode without a standby signal from the outside and thereby reducing the cost for a photocoupler and its peripheral circuit used for standby and improving system reliability.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A current resonant power supply device comprising:
a first switch and a second switch connected in series to both terminals of a DC power source;
a series circuit comprising a reactor, a primary winding of a transformer, and a capacitor connected in series, and connected to a node between the first and second switches and one terminal of the DC power source;
a rectifier smoothing circuit that rectifies and smoothens a voltage generated across a secondary winding of the transformer and outputs a DC voltage;
a control circuit that alternately turns the first and second switches on and off;
a voltage detection circuit that detects the DC voltage from the rectifier smoothing circuit;
a signal generation circuit that generates a feedback signal based on the DC voltage detected by the voltage detection circuit, and outputs the feedback signal, the feedback signal being for turning the first and second switches on and off;
a load current detection circuit that detects load current contained in resonance current flowing through the capacitor by averaging the resonance current flowing through the capacitor during an ON period of the first switch;
a standby state detection circuit that detects a standby state based on the load current detected by the load current detection circuit and a standby threshold; and
a burst oscillation circuit that operates the first and second switches in a burst oscillation mode based on the feedback signal if the standby state is detected.

2. The current resonant power supply device of claim 1, wherein, if the load current detected by the load current detection circuit is smaller than the standby threshold, the standby state detection circuit detects the standby state and outputs a standby state detection signal to the burst oscillation circuit.

3. A current resonant power supply device comprising:
a first switch and a second switch connected in series to both terminals of a DC power source;
a series circuit comprising a reactor, a primary winding of a transformer, and a capacitor connected in series, and connected to a node between the first and second switches and one terminal of the DC power source;
a rectifier smoothing circuit that rectifies and smoothens a voltage generated across a secondary winding of the transformer and outputs a DC voltage;
a control circuit that alternately turns the first and second switches on and off;
a voltage detection circuit that detects the DC voltage from the rectifier smoothing circuit;

a signal generation circuit that generates a feedback signal based on the DC voltage detected by the voltage detection circuit, and outputs the feedback signal, the feedback signal being for turning the first and second switches on and off;

a load current detection circuit that detects load current contained in resonance current flowing through the capacitor;

a standby state detection circuit that detects a standby state based on the load current detected by the load current detection circuit and a standby threshold; and a burst oscillation circuit that operates the first and second switches in a burst oscillation mode based on the feedback signal if the standby state is detected, wherein the burst oscillation circuit comprises a charge and discharge controller that is turned on or off depending on magnitude of the feedback signal, a signal capacitor that is charged if the charge and discharge controller is turned on and to be discharged if the charge and discharge controller is turned off, and a burst oscillation operation unit that activates or deactivates the burst oscillation operation depending on magnitude of a voltage from the signal capacitor.

4. A current resonant power supply device comprising:

a first switch and a second switch connected in series to both terminals of a DC power source;

a series circuit comprising a reactor, a primary winding of a transformer, and a capacitor connected in series, and connected to a node between the first and second switches and one terminal of the DC power source;

a rectifier smoothing circuit that rectifies and smoothens a voltage generated across a secondary winding of the transformer and outputs a DC voltage;

a control circuit that alternately turns the first and second switches on and off;

a voltage detection circuit that detects the DC voltage from the rectifier smoothing circuit;

a signal generation circuit that generates a feedback signal based on the DC voltage detected by the voltage detection circuit, and outputs the feedback signal, the feedback signal being for turning the first and second switches on and off;

a load current detection circuit that detects load current contained in resonance current flowing through the capacitor;

a standby state detection circuit that detects a standby state based on the load current detected by the load current detection circuit and a standby threshold;

a burst oscillation circuit that operates the first and second switches in a burst oscillation mode based on the feedback signal if the standby state is detected;

an AC power source;

a power factor correction circuit that corrects a power factor of AC current with respect to an AC voltage from the AC power source; and an operation stop controller that stops an operation of the power factor correction circuit if the standby state is detected by the standby state detection circuit.

5. The current resonant power supply device of claim 1, wherein the load current detection circuit detects load current contained in resonance current flowing through the primary wiring of the transformer.

6. The current resonant power supply device of claim 1, wherein the load current detection circuit comprises a second capacitor that detects load current contained in resonance current flowing through the capacitor.

7. The current resonant power supply device of claim 1, wherein the standby state detection circuit comprises a comparator that detects the standby state based on the detected load current and the standby threshold.

8. The current resonant power supply device of claim 1, wherein the load current detection circuit comprises two capacitors.

* * * * *